United States Patent [19]
Hile et al.

[11] Patent Number: 5,319,776
[45] Date of Patent: Jun. 7, 1994

[54] IN TRANSIT DETECTION OF COMPUTER VIRUS WITH SAFEGUARD

[75] Inventors: John K. Hile; Matthew H. Gray, both of Monroe; Donald L. Wakelin, Tecumseh, all of Mich.

[73] Assignee: Hilgraeve Corporation, Monroe, Mich.

[21] Appl. No.: 954,784

[22] Filed: Sep. 29, 1992

Related U.S. Application Data

[63] Continuation of Ser. No. 511,218, Apr. 19, 1990, abandoned.

[51] Int. Cl.$^5$ .................................................. H04L 9/00
[52] U.S. Cl. ......................................... 395/575; 380/4; 371/67.1
[58] Field of Search ...................... 364/200; 380/4, 25, 380/24; 371/67.1; 395/575

[56] References Cited

U.S. PATENT DOCUMENTS

| | | | |
|---|---|---|---|
| 4,384,325 | 5/1983 | Slechta et al. | 364/200 |
| 4,386,416 | 5/1983 | Giltner et al. | 364/900 |
| 4,864,573 | 9/1989 | Horsten | 371/5.1 |
| 4,975,950 | 12/1990 | Lentz | 380/4 |
| 4,979,210 | 12/1990 | Nagata et al. | 380/3 |
| 5,020,059 | 5/1991 | Gorin et al. | 371/11.3 |
| 5,051,886 | 9/1991 | Kawaguchi et al. | 364/200 |
| 5,144,659 | 9/1992 | Jones | 380/4 |
| 5,144,660 | 9/1992 | Rose | 380/4 |

OTHER PUBLICATIONS

Scientific American, "Cryptography and Computer Privacy", May 1973, vol. 228, No. 5, pp. 15-23.
Wiseman, Simon, "Preventing Viruses in Computer Systems", Elsevier Science Publishers Ltd., Computer & Security, Aug. 1989, pp. 427-432.
README file from the IBM Virus Scanning Program, Version 1.1, VIRSCAN.DOC from Version 1.2, IBM Virus Scanning Program's Version 1.2.
Simultaneous Search for Multiple Strings, Winter edition 1988 of the C Gazette, pp. 25-34, John Rex.

*Primary Examiner*—Charles E. Atkinson
*Assistant Examiner*—Ly V. Hua
*Attorney, Agent, or Firm*—Harness, Dickey & Pierce

[57] ABSTRACT

Data is tested in transit between a source medium and a destination medium, such as between two computer communicating over a telecommunications link or network. Each character of the incoming data stream is tested using a finite state machine which is capable of testing against multiple search strings representing the signatures of multiple known computer viruses. When a virus is detected the incoming data is prevented from remaining on the destination storage medium. Both hardware and software implementations are envisioned.

20 Claims, 5 Drawing Sheets

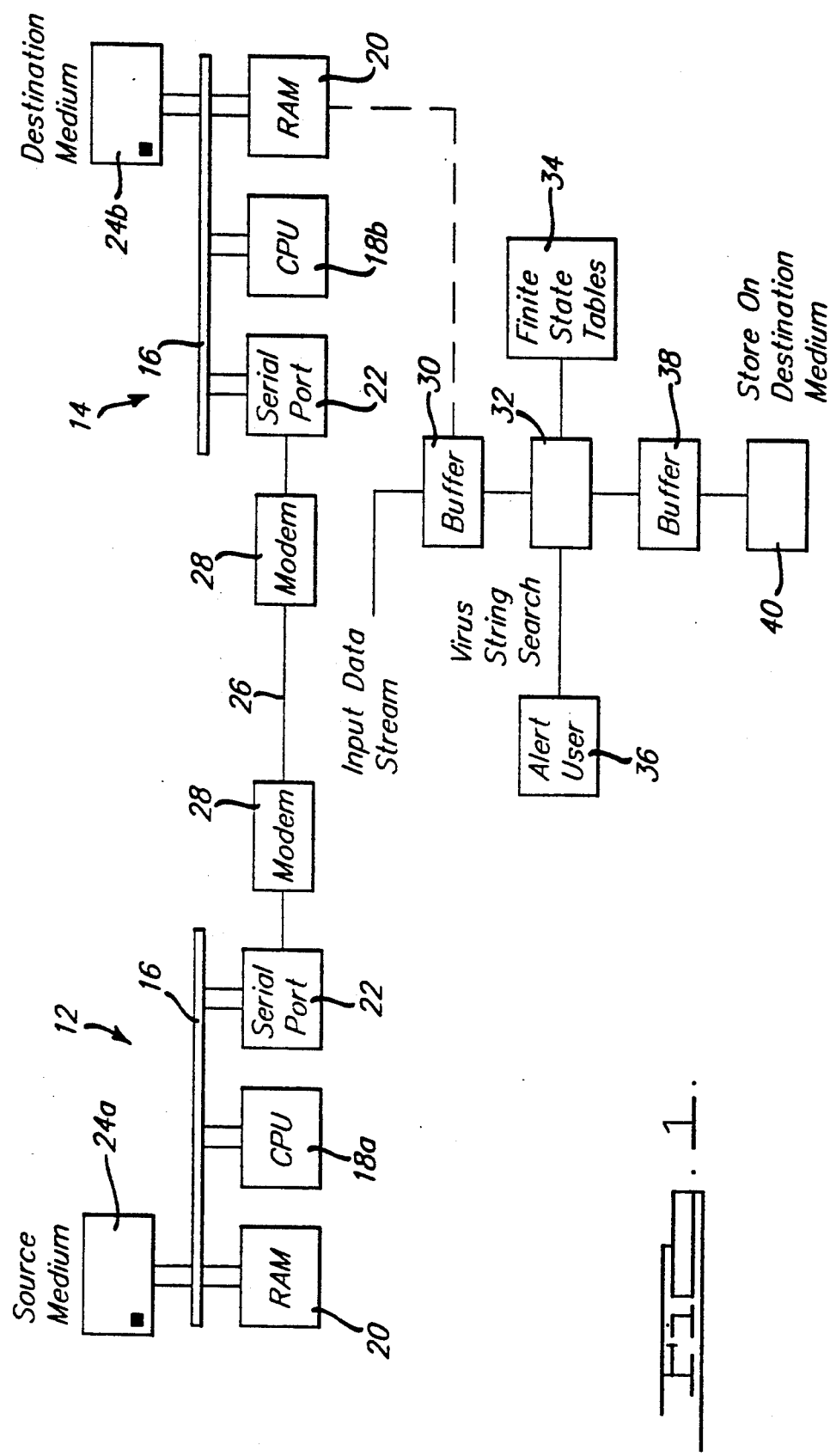

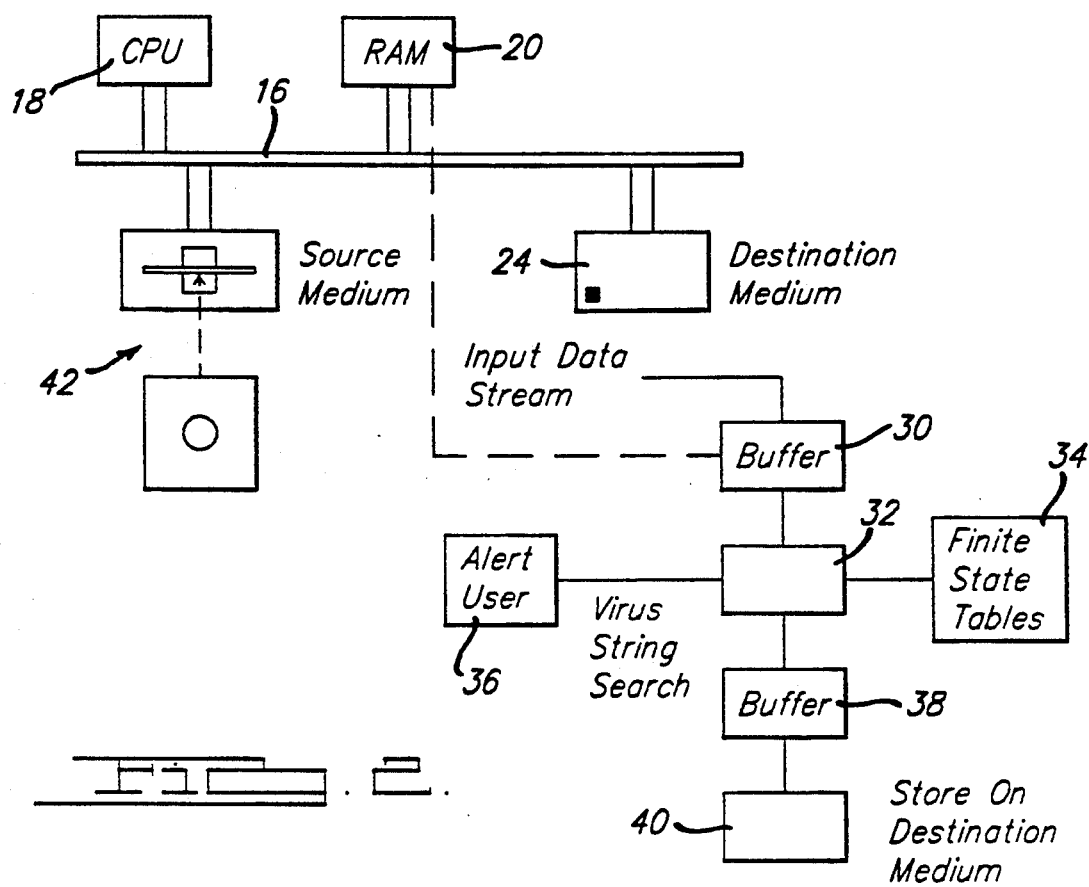
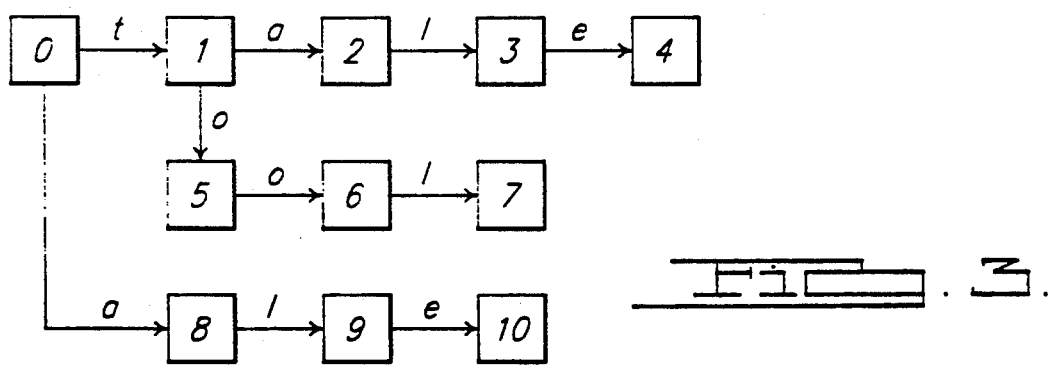

IN TRANSIT DETECTION OF COMPUTER VIRUS WITH SAFEGUARD

This is a continuation of U.S. patent application Ser. No. 07/511,218, filed Apr. 19, 1990, now abandoned.

BACKGROUND AND SUMMARY OF THE INVENTION

The present invention relates generally to data transfer systems and computer virus detection.

Computer viruses, including but not limited to self-replicating viruses, are a major concern to computer system operators. Although the mechanisms and destructive capabilities vary, typically computer viruses take the form of an executable program which attaches itself to or otherwise alters another executable program or data file contained on the storage medium of the computer. Computer viruses enter the computer system either by being loaded from a removable medium, such as a magnetic diskette, or by being downloaded over a communication system via a modem or network architecture. Often a computer virus will enter a computer system unbeknown to the operator. In many cases the presence of the virus may not be detected for months, during which time the file containing the virus or other files corrupted by the virus may be shared with other computer systems, infecting them also.

The computer virus problem is particularly acute in networked systems, where the opportunity for transmitting the virus from computer to computer is greatly increased. To combat the problem, others have employed virus scanning programs which read the files stored on a storage medium, looking for known virus signatures. These signatures comprise sequences of data which have been found to be present in a known virus. As an example, IBM has published a Virus Scanning Program, Version 1.1, which includes a compilation of known virus signatures. These known virus signatures are contained in a file entitled "SIGFILE.LST" associated with the Virus Scanning Program. Further details of the IBM Virus Scanning Program can be obtained by contacting the International Business Machine Corporation.

One major shortcoming of these virus scanning programs is that the virus may have already corrupted the data storage medium before the scanning program is used. Since the conventional virus scanning program tests files which are already stored on the computer system's storage media, such programs simply alert the user that the computer has a virus. These programs do not automatically prevent the virus from being stored on the medium in the first place, hence they cannot totally prevent the virus from attacking or spreading.

The present invention solves this problem by performing an in transit detection of computer viruses using a finite state machine technique which allows multiple virus signatures to be simultaneously tested for. Because the invention is able to test for viruses "on the fly," it is useful in data communications systems and in file copying systems to inhibit the virus from entering the computer in the first place. In a data communications system, for example, an incoming serialized bitstream transmission can be tested for a plurality of different known virus signatures. If any one or more of the signatures are detected, the file into which the incoming bitstream would have been stored is closed or aborted so the virus does not take up residency on the storage medium. For added safety, any portion of the file already written can be overwritten with 1's or 0's to ensure that none of the virus remains.

The invention may also be used to guard against the spread of a virus during a file copying operation, such as the operation of copying a file from a removable diskette to the hard disk storage medium of a computer. By inhibiting the storage of a virus-containing file onto the hard disk, the invention protects the computer system and prevents the virus from spreading to other computer systems which communicate with that system.

The invention is therefore able to prevent the spread of computer viruses, as contrasted with merely detecting when that spread has already taken place. Accordingly, the invention is applicable to a data transfer system for receiving a transmission of digital data for storage in a computer storage medium. The invention provides a method of identifying and inhibiting the storage of data containing at least one predefined sequence, which could be, for example, a computer virus signature. The method comprises the steps of causing a transmission of digital data resident on a source storage medium to be transmitted to a computer system having a destination storage medium.

The method further comprises receiving and processing the transmission to determine if at least one predefined sequence is present in the transmission. In response to this processing, the digital data of the transmission is caused to be stored on the destination storage medium, if none of the predefined sequences are present. In response to the processing, the digital data of the transmission is inhibited from being stored on the destination storage medium if at least one predefined sequence is present. As will be further explained, the predefined sequence can be a computer virus signature.

In the presently preferred embodiment the processing step is performed using a finite state machine which is capable of simultaneously testing to determine if at least one or more predefined sequences are present in the transmission. The finite state table of the preferred embodiment is loaded as a prebuilt table into a computer for use with the finite state machine.

The inhibiting step may be performed using the file handling mechanism of the destination storage medium. Using this approach, any stored data is selectively marked to be retained or to be discarded by overwriting. If desired, the inhibiting step can include the actual overwriting of at least a portion of the data marked to be discarded. The inhibiting step may also be performed by buffering the digital data prior to storage on the destination storage medium and by discarding the buffered data if at least one predefined sequence is present.

For a more complete understanding of the invention, its objects and advantages, reference may be had to the following specification and to the accompanying drawings.

BRIEF DESCRIPTION OF THE DRAWINGS

FIG. 1A is a block diagram or a data communications system in which data transmitted over a telecommunications link between two computer systems is tested in transit using the invention. FIG. 1 also depicts an overall flow diagram of the in transit detection process;

FIG. 2 is a block diagram of a file copying mechanism using the invention to test the data transmission in transit;

FIGS. 3–5 describe the finite state machine used to detect virus signatures in the present invention;

FIGS. 6a-6c comprise a detailed flow diagram of the presently preferred method implemented by the invention.

DESCRIPTION OF THE PREFERRED EMBODIMENT

Figure 3A:
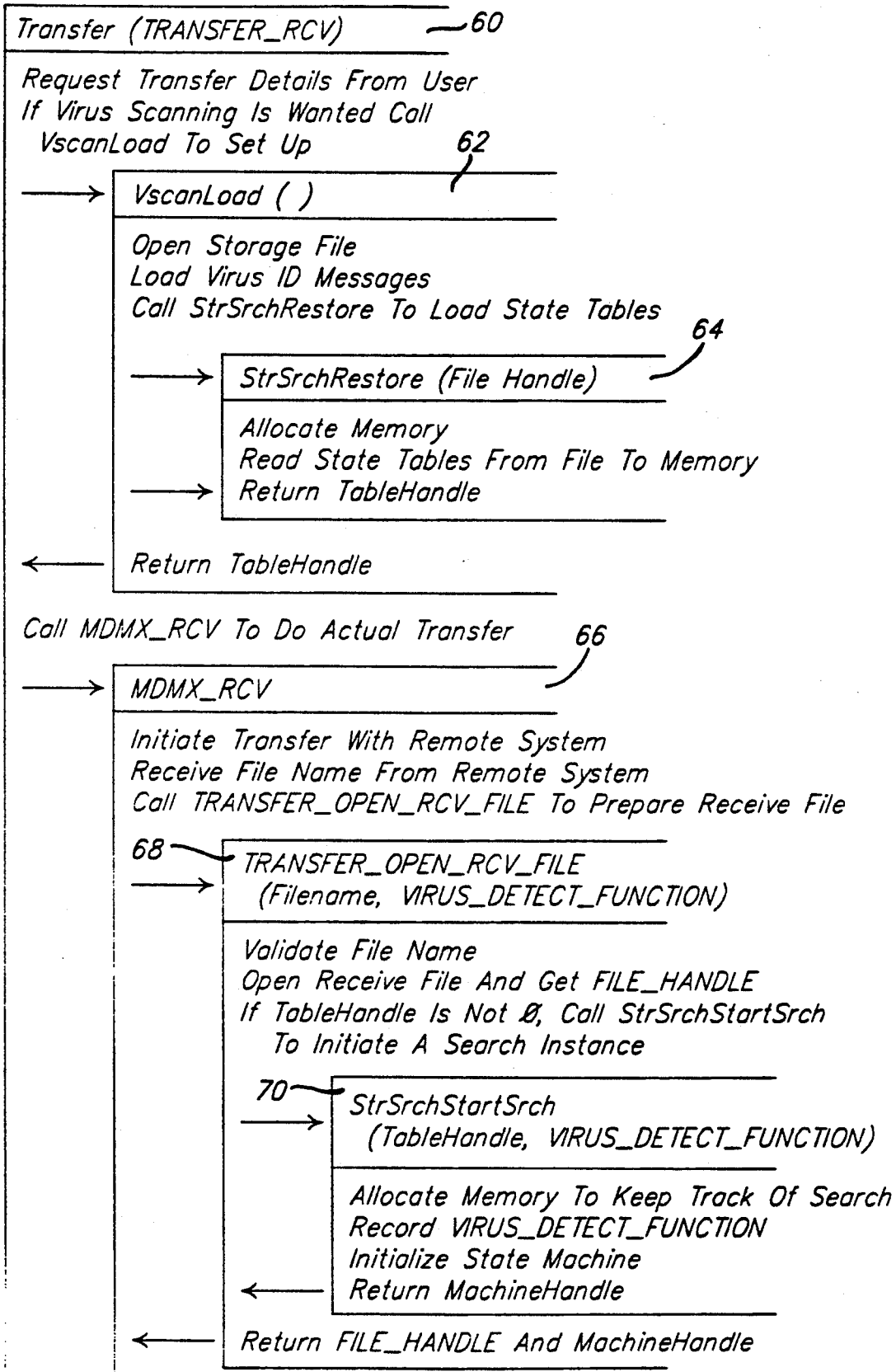

The invention will be described in conjunction with a communications system which may be used to send and receive data via modems over a telecommunications link. However, it will be understood that the principles of the invention can be extended to in transit detection of computer viruses for other types of systems, including file copying mechanisms. Accordingly, FIG. 1 illustrates the general configuration of a data telecommunications system illustrating one possible application of the invention. For comparison, FIG. 2 illustrates the invention implemented in a file copying application.

Referring to FIG. 1A, first computer system 12 and a second computer system 14 are diagrammatically illustrated. Each computer system has a bus 16, a central processing unit (CPU) 18a and 18b, respectively, random access memory (RAM) 20 and a serial port 22. The CPU, RAM and serial port elements are connected to the bus as illustrated. Each computer system includes a data storage medium, such as a hard disk designated by reference numeral 24a and 24b, respectively. The hard disk storage media 24a and 24b are connected to the respective busses 16, as illustrated. Thus, the hard disk storage medium 24a is in the domain of CPU 18a, while hard disk storage medium 24b is in the domain of CUP 18b.

The two computer systems are connected over a telecommunication link 26 using modems 28, which are connected to the respective serial ports 22. For purposes of illustrating the principles of the invention, it will be assumed that the first computer system will transmit data over telecommunication link 26 to the second computer system. It will be further assumed that the data to be transmitted is initially stored on a storage medium 24a of system 12 and after transmission will also be stored on storage medium 24b of system 14. Thus, storage medium 24a may be considered the source medium while storage medium 24b may be considered the destination medium.

In a telecommunications system, often the user of the second computer system 14 will have no direct control over the integrity of files stored on the source medium 24a. A file on source medium 24a may be corrupted by a virus, for example. Assuming the user of computer system 14 has been careful, the destination medium can be characterized as a known secure storage medium. From the computer system 14 user's standpoint, the source medium may be considered an insecure storage medium, since the user of system 14 does not control what is stored on the source medium.

Before giving a detailed description of the presently preferred implementation, a general overview will be given referring to FIG. 1. The present invention is capable of being implemented in software or hardware, although the software implementation is presently preferred and will be described in greater detail. CPU 18b and RAM 20 associated with CPU 18b perform in the in transit detection illustrated in the flow diagram of FIG. 1B. The input data stream over telecommunication link 26 enters the modem and serial port of computer system 14 where it is placed by CPU 18b into an input buffer 30 comprising a portion of RAM 20. Typically, the input buffer 30 is configured to hold one or more blocks of data which have been transmitted over communication link 26 by the computer system 12. A cyclic redundancy check (CRC) or other error checks are performed on the data in input buffer 30. If a transmission error is detected, many communications protocols cause the block containing the error to be resent.

When the incoming data stream has been error checked and the input buffer becomes filled, in a conventional data communications system, the data in buffer 30 would be stored on the destination medium 24b. The present invention intervenes at this point by subjecting the buffered data to a character by character virus signature string search analysis depicted at 32. The string search routine is preferably implemented using a finite state machine based on preloaded finite state tables 34. If a virus signature is detected by the string search routine, the user is alerted at step 36, typically by an appropriate warning message displayed on the computer system monitor. Upon detection of a virus signature, any storage of the data onto destination medium 24b is terminated, with the receiving file being deallocated or marked to be overwritten.

If no virus signature is detected, the data is stored on destination medium 24b as depicted at 38 and 40. Most computer operating systems buffer data being written to the storage medium. This buffer is illustrated at 38.

Before turning to a more detailed analysis of the presently preferred implementation, refer to FIG. 2, which the invention in a file copy application. In this instance, the source medium may be a removable diskette 42 and the destination medium is a hard disk 24. The source and destination media of this example are thus in the domain of the same CPU 18. It is assumed in this example that the user wishes to copy a file from the removable diskette medium to the hard disk medium. The removable diskette may be considered an insecure storage medium, since it may contain a corrupted file or computer virus unknown to the user. The hard disk storage medium is considered a known secure storage medium, since the user has the opportunity to control what is and is not stored on this medium.

The invention is implemented essentially as described in connection with the FIG. 1B embodiment. The input data stream passes from the removable diskette medium into an input buffer 30, whereupon the buffered data is tested for virus signatures while it is in transit to the buffer 38 to be stored on the destination medium.

The presently preferred embodiment employs a finite state machine for simultaneously searching for multiple sequences representing different virus signatures. For a general overview of the finite state machine technique for string searching, reference may be had to an article "Simultaneous Searching For Multiple Strings" by John Rex, which appeared in the Winter 1988 edition of the C Gazette at pages 25-34, which is incorporated herein by reference. The general principles of the finite state machine will be explained with reference to FIGS. 3-5.

Figure 5B:
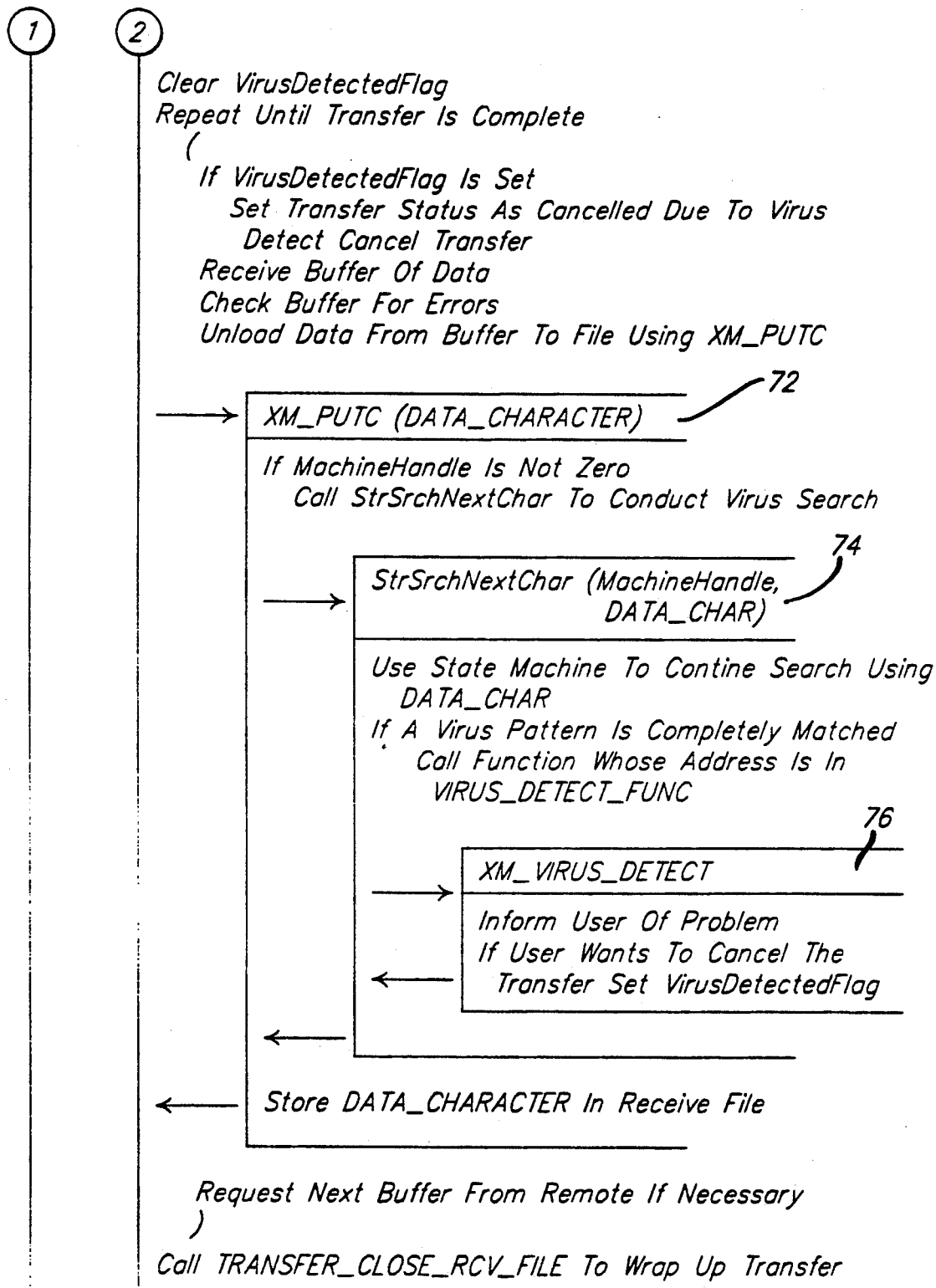

The finite state machine for simultaneously searching for the presence of at least one virus signature in a collection of multiple virus signatures can be understood from the simplified example of FIGS. 3-5. The example assumes that the three words "tale" "tool" and "ale" are the three virus signatures being searched for. Before any characters are tested, the machine state is initialized to the zero state shown in FIG. 3. When the incoming character is either a T or an A, the machine toggles to the next state, state 1 (for the character T) or state 8 (for the character A). If neither a T nor an A are received, the machine remains at state zero. As each successive character enters, it is tested and if a character match is found, the machine state will toggle forward in the direction of the arrows. Thus from state 1, if the next character is the letter A, the machine will toggle to state 2. At state 1 if the next character is an 0, the machine will toggle to state 5. If a character match does not occur with the character being tested, the test is said to have failed. When this occurs, the failure function of FIG. 4 is consulted to determine what the next state should be. For example, at state 1, if neither the letter A nor the letter 0 are received, the machine cannot toggle forward, hence a failure has occurred. Consulting the failure function of FIG. 4, state 1 fails back to state 0. By comparison a failure at state 2 fails back to state 8 and so forth. When states 4, 7 or 10 are reached, a virus match has occurred and the output function of FIG. 5 may be consulted to determine which signature has actually been detected. Note in this example reaching state 4 means that both "tale" and "ale" have occurred.

Figure 6C:
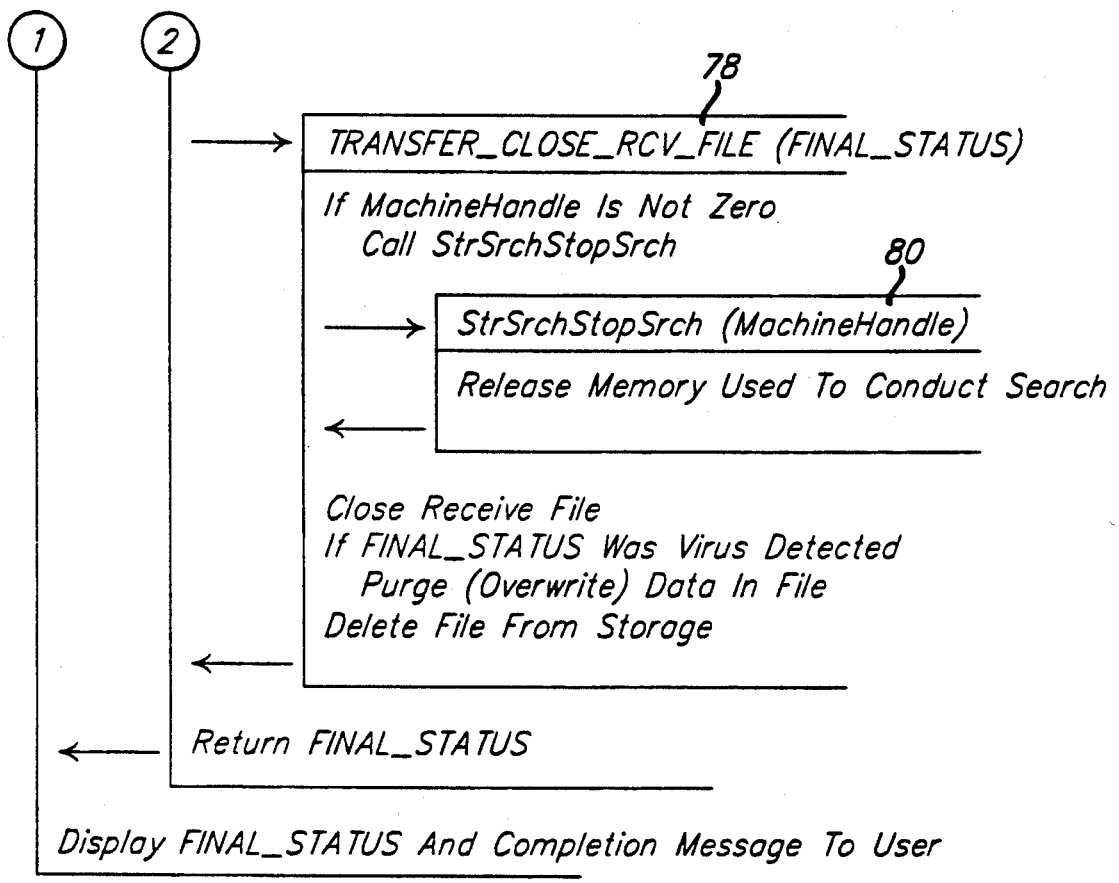

The presently preferred implementation is written in the C language. FIGS. 6a–6c illustrate the presently preferred implementation. For an even further detailed explanation, a pseudo code source listing is provided in the appendix. The pseudo code listing first lists the code for building the finite state machine, comprising functions StrSrchAddStr and StrSrchInit. The appendix thereafter lists the source code for running the finite state machine, beginning with the command "restart".

Referring now to FIGS. 6a–6c, the invention may be incorporated into the program procedure or function which transfers the incoming data stream to the destination medium for storage. Accordingly, the entire sequence of operations illustrated in FIGS. 6a–6c are shown being nested within the transfer routine which commences at step 60. To aid the reader, the vertical lines of FIGS. 6a–6c which span all three figures have been labeled with the encircled numbers 1 and 2. Therefore FIGS. 6a–6c may be arranged end to end by aligning the encircled numbers 1 and 2.

The transfer routine begins by requesting transfer details from the user. In a data communications program it is common to offer several different error free data transfer protocols, which the user selects at this point. The user is also given the opportunity at this point to select whether virus scanning is desired. If the virus scanning is selected, the VscanLoad routine is called to load the prebuilt finite state tables into RAM 20. The VscanLoad routine is depicted at step 62. The VscanLoad routine operates by first opening a storage file, loading the virus I.D. messages and then calling the StrSrchRestore to load the state tables for the finite state machine. The StrSrchRestore routine, depicted at step 64, allocates the necessary memory to hold the tables, reads the state tables from a disk file into that memory and then returns the TableHandle. The TableHandle is used to identify the table for subsequent use by other parts of the program. By using an assigned TableHandle, the invention can be extended to multiple table embodiments wherein each table would have its own unique TableHandle.

Having completed the VscanLoad the transfer routine calls the routine entitled mdmx_rcv to perform the actual transfer. For purposes of illustration, it has been assumed that the user selected the YMODEM error free protocol, which corresponds to the routine mdmx_rcv. The mdmx_rcv routine begins at step 66. A different routine may be employed if the user selected a different file transfer protocol. The mcmx_rcv routine begins by initiating the transfer with the remote system wherein (e.g. computer system 12).

In practice, either the remote system (computer system 12) or the local system (computer system 14) can initiate the call which places the two in communication over the telecommunication link 26. For purposes of illustrating the invention, it is assumed that the user of the local system 14 has requested data from the remote system 12. The invention is, however, equally applicable in the case where the remote system has initiated a request to upload information to the local system. In both instances, the local computer system 14 must interact with the remote system 12, by giving the proper handshake signals, otherwise the transmission of data will not commence. In this regard, the local system 14 has the capacity for causing a transmission of digital data resident on the remote system 12 (e.g. hard disk storage medium 24a) to be transmitted to the local system.

In accordance with the YMODEM protocol, the mdmx_rcv routine receives the file name from the remote system which is sought to be transferred and then calls transfer_open_rcv_file to prepare the receive file. The transfer_open_rcv_file routine commences at 68, as illustrated in FIG. 6a.

The transfer_open_rcv_file routine 68 begins by validating the file name, opening a receive file on the destination medium (e.g. hard disk storage medium 24b) and getting a file handle according to the computer operating system rules. It will be recalled that the VscanLoad returned a TableHandle which identifies the finite state machine tables to be used. If the user had elected not to perform virus scanning, the TableHandle would be set to zero. The transfer_open_rcv_file routine checks the TableHandle for a nonzero value then calls the StrSrchStartSrch procedure depicted at step 70.

The procedure at step 70 allocates the necessary memory to keep track of the search to be performed by the finite state machine. It records the virus_detect_function and initializes the finite state machine. The StrSrchStartSrch routine then returns a MachineHandle. The MachineHandle is used to identify the finite state machine to be used for the input data stream entering through serial port 22. By use of an assignable MachineHandle, the invention is able to support separate simultaneous data transfers which may overlap in time. In other words, the system could be configured with multiple input ports, such as multiple serial ports 22, all receiving data at the same time. The respective input data streams entering these ports would be applied to the finite state machine, in all probability at different states, with the MachineHandles being used to designate these different states.

Referring now to FIG. 6b the mdmx_rcv routine 66 continues by clearing the VirusDetectedFlag prior to entering a loop which tests the VirusDetectedFlag, sets the transfer status as cancelled if the VirusDetectedFlag is set and then cancels the transfer. If the VirusDetectedFlag is not set the input data stream is received into a buffer, checked for errors and written to the disk file on the destination medium using a routine designated xm_putc. The xm_putc routine is shown at step 72.

If the MachineHandle is nonzero, indicating that virus scanning is to be performed, the StrSrchNextChar routine at step 74 is called to conduct the actual virus search using the finite state machine. If a virus pattern is completely matched StrSrchNextChar calls the virus detection function, xm_virus_detect at step 76. The virus detection function informs the user that a virus has been detected and gives the user the option to cancel the transfer by setting the VirusDetectedFlag.

The xm_putc routine then continues by storing the received data character in the designated receive file. After this has been accomplished, the mdmx_rcv routine (step 66) then requests the next block of data from the remote system 12, thereby causing a further transmission of digital data to be transmitted over the telecommunication link 26. The mdmx rcv process repeats until the entire transfer is complete. However, if the VirusDetectedFlag is set during the transfer, the transfer will of course be cancelled prematurely.

With reference to FIG. 6c the mdmx_rcv routine (step 66) next performs the transfer_close_rcv_file routine, shown at step 78. Assuming the MachineHandle is not zero (i.e. virus detection is being performed) the StrSrchStopSrch routine at step 80 is performed to release the memory used by the virus string search routine. The receive file is then closed in accordance with the operating system requirements. If a virus was detected during the transfer, the routine at step 78 can be made to purge the data in the file by overwriting it with 1's or 0's and the file is then deleted from storage. The file may be deleted from storage by using the file handling mechanism of the operating system which may be used to selectively mark the file to be retained or to be discarded by overwriting. Some operating systems, such as the MS-DOS operating system delete a file by altering the first character of the file name in the file directory of the data storage mediums and by setting a status bit which frees the space used by that file for use by other files during subsequent disk writing operations. The MS-DOS operating system simply marks the data to be overwritten, but does not actually overwrite or erase that data. Ordinarily this is not a problem, since the file marked to be discarded will not be invoked by the operating system command processor. Nevertheless, even greater security is afforded by the step of actually purging the data by overwriting it (with 1's or 0's, for example).

Having accomplished the foregoing tasks, the mdmx_rcv routine (step 66) terminates by returning a final_status message and the transfer routine (step 60) displays the final_status and the completion message to the user.

For those interested in further details of the StrSrchNextChar routine (step 74) reference may be had to the pseudocode in the appendix appearing under the heading "state machine running".

In order to enhance the string searching speed and in order to minimize memory requirements, the presently preferred embodiment loads a prebuilt finite state table (see step 64). Since the virus signatures sought to be detected are known in advance (e.g. they are available from IBM's SIGFILE.LST), the state tables can be constructed before the file transfer is performed. Preferably, these tables are compiled in relocatable form suitable for being read from a disk file into memory only when needed (i.e. only when VScanLoad is run).

The pseudo code appendix under the heading "state machine building" shows how to generate these prebuilt tables based on a preferred data structure. Specifically, in the pseudo code listing, see the functions StrSrchAddStr and StrSrchInit. The data structure used to implement the presently preferred prebuilt state tables comprises an array of structures in accordance with the following:

```
struct stExcept
    {
    struct      stExcept *next;
    USHORT      usMatch;
    USHORT      usNextState;
    };
struct stState
    {
    UCHAR       uchMatch;
    /* character to look for as match */
    union
        {
        struct stExcept *pstNextState;
        /* used when building tables */
        USHORT usNextState;
        /* used in final form of stState */
        } uSt;
    USHORT      usFailState;
    };
struct stBase
    {
    BOOL        fFlags;
    ULONG       key;
    /* for internal validation */
    USHORT      usNextState;
    /* next state available in finite state mach */
    USHORT      usUsageCount;
    /* usage count */
    struct      stState FAR *astStateArray;
    /*array of primary states */
    USHORT      usNumStates;
    /* number of primary states available */
    ULONG       ulSizeStates;
    /* size of StateArray */
    SHORT       FAR *asExceptArray;
    /* array for exceptions */
    ULONG       ulSizeExcepts;
    /* size of ExceptArray */
    struct      stState stFirst[256];
    /* table for state ZERO */
    };
struct stMach
    {
    ULONG       key;
    /* for internal validation */
    struct      stBase FAR *pstBase;
    /* pointer to table to use */
    USHORT      usState;
    /* current state */
    struct      stState FAR *pstState;
    /* pointer to current state */
    VOID        (*outptr) (USHORT id);
    /* function to call output */
    };
```

The above data structures take advantage of the fact that most states only toggle to a single next state. For example, state 2 of FIG. 3 toggles only to state 3. Accordingly, to save memory space the data structure is constructed as a simple table giving the character being searched for (uchMatch), the state to jump to when a match is found (usNextStat) and the state to jump to when failure occurs (usFailState). Thus for example, referring to FIG. 3, if the machine is at state 2, the variable uschMatch contains the character L; the variable usNextState contains state 3 and the variable usFailState contains the state 8.

For those states which branch to multiple locations, such as states 0 and 1 in FIG. 3, a larger data structure is required. The presently preferred data structure includes an "exception" array for containing the additional required information. For example the exception array pertaining to state 1 of FIG. 3 would contain the two potential matched characters A and 0 and well as the respective next states 2 and 5. States which produce output (i.e. those which indicate a virus has been positively identified) also require additional data structure storage. For example, states 4, 7 and 10 of FIG. 3 all product output which is stored in the exception array.

The program accesses the exception array every time the character 0 (zero) is placed in the variable uchMatch. That is, the character 0 is used as a flag or signal to indicate that the exception array data must be accessed. It is, of course, possible that the character 0 may itself be searched for as one of the characters of a virus signature. In these instances, the character 0 in the uchMatch variable is still used to invoke the additional exception array. But in this instance, the exception array will contain the 0 as the "uchMatch" character to be searched.

Use of the character 0 as a flag for invoking the exception array is advantageous from several standpoints. First, since most virus signature strings comprise portions of executable machine code, the character 0 is not normally present. Typically, the character 0 would be present in executable machine code either as a "no operation" (NOP) instruction, which does nothing and is infrequently used, or as a part of an address or constant value. Thus the character 0 is expected to occur far less frequently than other characters. Second, most present CPU's test for the presence or absence of the character 0 much more quickly than they can test for other characters. Hence use of the character 0 as the flag for accessing the extended exception array optimizes speed.

Because it is quite common to have multiple branch points from state 0, the presently preferred implementation uses a lookup table for the 0 state, in place of the above-described data structure. The lookup table contains an entry for every possible incoming character, giving the appropriate next state. With reference to the Appendix, under the heading "State Machine Running" it is seen that the presently preferred program tests to determine if the CURRENT STATE is 0. If so, the STATE 0 TABLE is used. By constructing the program in this fashion, greater operating speed is achieved.

Those skilled in the art will recognize that the principles of the invention can be extended to a range of different applications. The foregoing has explained some of the possible uses of the invention, but the invention can be extended to other uses as well. Although described using examples written in the C programming language, this should not be viewed as a limitation, since numerous computer languages could be selected for implementing the invention. Moreover, while the software implementation is presently preferred, some or all of the modules described herein could be implemented in hardware, as in the form of add on circuitry for a "virus free" modem, for example.

Accordingly, while the invention has been described in its presently preferred embodiments, certain modifications may be made without departing from the spirit of the invention as set forth in the appended claims.

APPENDIX

State machine building

```
/*=-=-=-=-=-=-=-=-=-=-=-=-=-=-=-=-=-=-=-=-=-=-=-=-=-=-=-=-=-=-=-=-=-=-=-=-
 * StrSrchAddStr
 *
 * DESCRIPTION:
 *   Adds another string into the tables.  This must be called after CREATE
 *   and before INIT is called.
 *
 * ARGUEMENTS:
 *       SSHDLTBL  sHdl        -- handle to string search data set
 *       USHORT    len         -- length of data string to add
 *       VOID      *vptr       -- pointer to data to add, may include NULLs
 *       USHORT    id          -- id code to be returned upon string match
 *
 * RETURNS:
 *   0 if OK
 *   (-1) if there is an error.  An error can be any of the following:
 *       a. Not enough memory available for operation.
 *       b. Operation called out of sequence, before CREATE or after INIT.
 */

SHORT    StrSrchAddStr (SSHDLTBL sHdl,
                USHORT   len,
                VOID     *vptr,
                USHORT   id)
    { if (STATE ZERO TABLE ENTRY FOR FIRST CHAR IN STRING IS EMPTY)
        {
```

```
        ALLOCATE NEXT STATE IN EXTENDED STATE LIST
        )
else
    (
    FOLLOW PREVIOUSLY ALLOCATED CHAIN UNTIL INPUT STRING
    DIFFERS FROM ALLOCATED CHAIN
    if (MORE INPUT STRING TO PROCESS)
        (
        if (CURRENT NODE IS AN EXCEPTION NODE)
            (
            ALLOCATE A NEW EXCEPTION NODE AND LINK IT IN
            )
        else if (CURRENT NODE IS A FAIL-ONLY NODE)
            (
            CONVERT NODE TO AN EXCEPTION NODE
            ADD AND OUTPUT STATE
            ALLOCATE A NEW EXCEPTION NODE AND LINK IT IN
            )
        else
            (
            ALLOCATE AN EXCEPTION NODE AND CONVERT THE CURRENT NODE
                TO AND EXCEPTION NODE
                ALLOCATE A NEW EXCEPTION NODE AND LINK IT IN
                )
            )
        )

/*
     * Finished with prefix code, just insert the data into the array
     */ while (MORE CHARACTERS IN THE INPUT STRING)
        (
        ALLOCATE NEXT STATE IN EXTENDED STATE LIST
        if (CURRENT CHARACTER IS SPECIAL CHARACTER)
            (
            ALLOCATE EXCEPTION NODE AND LINK INTO EXTENDED STATE LIST
            )
        else
            (
            FILL IN THE CURRENT STATE INFORMATION IN THE EXTENDED STATE
LIST
            )
        CONTINUE WITH NEXT CHARACTER
        )

/*
     * Once we reach the end, we build and exception node for the output.
     */

/*
     * Are we at the end of a string, or in the middle of an existing one
     */ if (AT END OF CHAIN IN STATE SEQUENCE AND NO FAIL-ONLY OR EXCEPTION)
        (
        ALLOCATE FAIL-ONLY STATE AND LINK INTO EXTENDED STATE LIST
        )
    else if (AT END OF CHAIN IN STATE SEQUENCE)
        (
        ALLOCATE FAIL-ONLY STATE AND LINK INTO EXCEPTION LIST
        )
    else
        (
        /* in the middle of a string */
        ALLOCATE EXCEPTION NODE AND LINK INTO EXTENDED STATE LIST
```

```
        ALLOCATE FAIL-ONLY NODE AND LINK TO EXCEPTION LIST
        }

/*
 * That does it for now
 */
return (SS_OK);
}
/*=-=-=-=-=-=-=-=-=-=-=-=-=-=-=-=-=-=-=-=-=-=-=-=-=-=-=-=-=-=-=-=-=-=-
=-=-
 * StrSrchInit
 *
 * DESCRIPTION:
 *   Finishes building tables for multiple string search functions
 *
 * ARGUEMENTS:
 *   SSHDLTBL sHdl    -- handle to string search structure
 *
 * RETURNS:
 *   0 if everything OK
 *  -1 if an error of some sort
 */

SHORT StrSrchInit (SSHDLTBL sHdl)
      { for (SIZE OF STATE ZERO TABLE)
         {
         if (NEXT STATE IS SET)
            {
            MERGE IN OTHER FAIL PATHS BASED UPON NEXT STATE
            ADD STATE TO INTERNAL FIFO QUEUE
            }
         else
            {
            SET NEXT STATE TO ZERO
            }
         SET FAIL STATE
         } while (STATE IS AVAILABLE FROM INTERNAL FIFO QUEUE)
         {
         for (EACH POSSIBLE INPUT CHARACTER)
             {
             if (NEXT STATE BASED UPON THE CURRENT INPUT CHARACTER IS SET)
                {
                ADD THE NEXT STATE TO THE INTERNAL FIFO QUEUE
                LINK UP CHAINS OF FAIL STATES AND OUTPUT STATES
                }
             }
         }

/*
      * Now we need to reallocate space and move stuff from linked lists
      * into a second static table that we can read and write from disk
      */
     REALLOCATE SPACE FOR EXTENDED STATE TABLE DOWN TO SIZE ACTUALLY USED COUNT UP SPACE NEEDED FOR EXCEPTION ARRAY
         ALLCATE SPACE FOR EXCEPTION ARRAY
         COPY EXCEPTION LIST INTO THE EXCEPTION ARRAY
         FREE EXCEPTION LIST
```

State machine running:

restart:

```
/*
 * This first sections determines the state changes resulting
 * from the input of the character uchChar
 */ if (CURRENT STATE == 0)
    {
    /* This section uses the STATE ZERO TABLE */
    if (NEXT STATE (from state 0 table indexed by uchChar) != 0))
        {
        fMatch = TRUE;
        }
    else
        {
        CURRENT STATE = 0;
        RETURN;
        }
    }
else
    {
    /* This section uses the EXTENDED STATE TABLE */
    if (MATCH CHARACTER != SS_EXCEPT)
        {
        if (MATCH CHARACTER == uchChar)
            {
            fMatch = TRUE;
            CURRENT STATE = NEXT STATE;
            }
        else
            {
            CURRENT STATE = FAIL STATE;
            goto restart;
            }
        }
    else
        {
        SKIP OVER OUTPUT ONLY TABLE ENTRYS
        SEARCH CHARACTER/STATE PAIRS FOR A MATCH
        if (CHARACTER IN PAIR == uchChar)
            {
            CURRENT STATE = STATE IN PAIR;
            fMatch = TRUE;
            }
        if (!fMatch)
            {
            CURRENT STATE = FAIL STATE;
            goto restart;
            }

}
    }

/*
 * fMatch tells if we got a match.
 */
```

```
            if (fMatch)
            {
                    CALL ASSOCIATED OUTPUT FUNCTIONS
                    if (MATCH CHARACTER == SS_FAIL)
                    {
                            CURRENT STATE = FAIL STATE;
                    }
            }
            RETURN;
        }
```

What is claimed is:

1. In a system for transferring digital data for storage in a computer storage medium, a method of screening the data as it is being transferred and automatically inhibiting the storage of screened data containing at least one predefined sequence, comprising the steps of:
    causing a quantity of digital data resident on a source storage medium to be transferred to a computer system having a destination storage medium;
    receiving and screening the transferred digital data prior to storage on the destination storage medium to determine if at least one of a plurality of predefined sequences are present in the digital data received; and
    in response to said screening step:
    (a) automatically causing the screened digital data to be stored on said destination storage medium if none of the plurality of predefined sequences are present, and
    (b) automatically inhibiting the screened digital data from being stored on said destination storage medium if at least one predefined sequence is present.

2. The method of claim 1 wherein at least one predefined sequence is based upon a computer virus signature.

3. The method of claim 1 wherein said screening step is performed using at least one finite state table.

4. The method of claim 1 wherein said screening step includes decompressing the digital data received.

5. The method of claim 1 wherein said screening step includes decompressing the digital data received and determining if at least one predefined sequence is present in the decompressed digital data using at least one finite state table.

6. The method of claim 1 wherein said screening step includes simultaneously testing to determine if at least one of at least two predefined sequences are present in the digital data received.

7. The method of claim 1 further comprising loading a prebuilt finite state table in a computer and using said prebuilt finite state table to perform said screening step.

8. The method of claim 1 wherein said destination storage medium has an associated file handling mechanism whereby stored data is selectively marked to be retained and to be discarded by overwriting and wherein said inhibiting step comprises utilizing the file handling mechanism to mark data stored on said destination storage medium as a result of said transmission to be discarded.

9. The method of claim 8 wherein said inhibiting step further comprises overwriting at least a portion of the data marked to be discarded.

10. The method of claim 1 wherein said screening step is performed by buffering said digital data while determining if at least one predefined sequence is present in the digital data received and in response to said screening:
    (a) causing the buffered digital data to be stored on said destination storage medium if none of the predefined sequences are present, and
    (b) discarding the buffered digital data if at least one predefined sequence is present.

11. The method of claim 1 further comprising p1 performing an error check on the digital data received to determine if an error occurred during the data transfer and causing at least a portion of the data transfer to be repeated in the event an error occurred.

12. The method of claim 1 wherein said source storage medium and said destination storage medium are different parts of the same storage medium.

13. The method of claim 1 wherein said known destination storage medium is a nonvolatile storage medium.

14. The method of claim 1 wherein said source storage medium is in the domain of a first central processing unit and the destination storage medium is in the domain of a second central processing unit.

15. The method of claim 1 wherein said source storage medium is a removable medium adapted to be read by said computer system.

16. The method of claim 14 wherein said first and second central processing units communicate over a telecommunications link and wherein said digital data is sent over said link.

17. The method of claim 1 further comprising:
    causing a second quantity of digital data to be transferred to said computer system which at least partly overlaps in time with said data transfer from said source storage medium;
    receiving and substantially simultaneously processing the second quantity of digital data to determine if at least one of said predefined sequences is present in the second quantity of digital data.

18. A method of preventing the spread of computer viruses to a computer having a storage medium, comprising the steps of:
    simultaneously searching for a plurality of virus signatures, each of which comprising an identifiable digital sequence, while said computer is receiving a stream of digital data for storage on said storage medium;
    providing an indication of the detection of a virus from said searching step; and
    automatically inhibiting the storage of said digital stream on said storage medium if any of said virus signatures have been detected.

19. The method of claim 18, wherein said searching step includes the step of loading at least one prebuilt finite state table into a random access memory of said computer against which the digital stream is compared as the digital stream is received.

20. The method according to claim 19, wherein said digital stream is a file received as a serialized bitstream over a telecommunications link.

* * * * *

UNITED STATES PATENT AND TRADEMARK OFFICE
CERTIFICATE OF CORRECTION

PATENT NO. : 5,319,776
DATED : June 7, 1994
INVENTOR(S) : John K. Hile, Matthew H. Gray, Donald L. Wakelin It is certified that error appears in the above-indentified patent and that said Letters Patent is hereby corrected as shown below:

Column 2, line 59, "FIG. 1A" should be --FIG. 1--.

Column 2, line 59, "or" should be --of--.

Column 3, line 18, "FIG. 1A" should be --FIG. 1, a--.

Column 3, line 30, "CUP" should be --CPU--.

Column 3, lines 63/64, "FIG. 1B" should be --FIG. 1--.

Column 4, line 28, after "which" insert --shows--.

Column 4, line 43, "FIG. 1B" should be --FIG. 1--.

Column 6, line 3, delete "wherein".

Column 7, line 13, "mdmx rcv" should be --mdmx_rcv--.

Column 9, line 1, "and" should be --as--.

UNITED STATES PATENT AND TRADEMARK OFFICE
CERTIFICATE OF CORRECTION

PATENT NO. : 5,319,776
DATED : June 7, 1994
INVENTOR(S) : John K. Hile, Matthew H. Gray, Donald L. Wakelin It is certified that error appears in the above-indentified patent and that said Letters Patent is hereby corrected as shown below:

Column 9, line 6, "product" should be --produce--.

Column 15, line 1, insert --}--.

Column 18, line 10, claim 11, delete "p1".

Column 18, line 58, claim 19, "of" should be --according to--.

Signed and Sealed this

Second Day of May, 1995

BRUCE LEHMAN

Attest:

Attesting Officer

Commissioner of Patents and Trademarks